US009619711B2

(12) United States Patent
Ouzounis

(10) Patent No.: US 9,619,711 B2
(45) Date of Patent: Apr. 11, 2017

(54) MULTI-SPECTRAL IMAGE LABELING WITH RADIOMETRIC ATTRIBUTE VECTORS OF IMAGE SPACE REPRESENTATION COMPONENTS

(71) Applicant: DigitalGlobe, Inc., Longmont, CO (US)

(72) Inventor: Georgios Ouzounis, Remagen (DE)

(73) Assignee: DigitalGlobe, Inc., Westminster, CO (US)

( * ) Notice: Subject to any disclaimer, the term of this patent is extended or adjusted under 35 U.S.C. 154(b) by 255 days.

(21) Appl. No.: 14/499,440

(22) Filed: Sep. 29, 2014

(65) Prior Publication Data

US 2016/0093056 A1    Mar. 31, 2016

(51) Int. Cl.
*G06K 9/46* (2006.01)
*G06K 9/00* (2006.01)
*G06T 11/00* (2006.01)
*G06K 9/68* (2006.01)
*G06T 9/00* (2006.01)

(52) U.S. Cl.
CPC ..... *G06K 9/00651* (2013.01); *G06K 9/00637* (2013.01); *G06K 9/00657* (2013.01); *G06K 9/6857* (2013.01); *G06T 9/008* (2013.01); *G06T 11/003* (2013.01); *G06K 2009/00644* (2013.01); *G06T 2207/30181* (2013.01); *G06T 2210/61* (2013.01)

(58) Field of Classification Search
None
See application file for complete search history.

(56) References Cited

U.S. PATENT DOCUMENTS

| 6,584,221 | B1 * | 6/2003 | Moghaddam | ..... G06F 17/30256 |
| | | | | 382/165 |
| 8,486,425 | B1 | 7/2013 | Shah et al. | |
| 8,630,510 | B2 | 1/2014 | Giuffrida et al. | |
| 8,682,079 | B1 | 3/2014 | Ouzounis | |

(Continued)

OTHER PUBLICATIONS

Remote sensing imagery in vegetation mapping: a review, Xie et al. Journal of plant ecology, vol. 1, No. 1, Mar. 2008, pp. 9-23.*

(Continued)

*Primary Examiner* — Jayesh A Patel
(74) *Attorney, Agent, or Firm* — Marsh Fischmann & Breyfogle LLP; Jonathon A. Szumny; Robert G. Crouch

(57) ABSTRACT

Automatic characterization or categorization of portions of an input multispectral image based on a selected reference multispectral image. Sets (e.g., vectors) of radiometric descriptors of pixels of each component of a hierarchical representation of the input multispectral image can be collectively manipulated to obtain a set of radiometric descriptors for the component. Each component can be labeled as a (e.g., relatively) positive or negative instance of at least one reference multispectral image (e.g., mining materials, crops, etc.) through a comparison of the set of radiometric descriptors of the component and a set of radiometric descriptors for the reference multispectral image. Pixels may be labeled (e.g., via color, pattern, etc.) as positive or negative instances of the land use or type of the reference multispectral image in a resultant image based on components within which the pixels are found.

24 Claims, 6 Drawing Sheets

(56) References Cited

U.S. PATENT DOCUMENTS

| | | | |
|---|---|---|---|
| 2006/0110044 A1* | 5/2006 | Reissman | G06K 9/469 |
| | | | 382/203 |
| 2007/0083808 A1* | 4/2007 | Setlur | G06F 17/2211 |
| | | | 715/239 |
| 2011/0075882 A1 | 3/2011 | Guo et al. | |
| 2011/0102461 A1 | 5/2011 | Schultz et al. | |
| 2014/0029867 A1 | 1/2014 | Giuffrida et al. | |
| 2015/0071528 A1* | 3/2015 | Marchisio | G06K 9/6269 |
| | | | 382/159 |

OTHER PUBLICATIONS

Introduction to remote sensing and image processing, IDRISI guide to GIS and Image processing vol. 1, pp. 17-34.*

A change vector analysis—State, Santos et al., Jan. 2002, pp. 1-9.*

A metric for evaluating—segmentations, Roger Trias-Sanz, IEEE, 0-7803-9051-2, 2005, pp. 1-5.*

Concept vector—structure, Liu et al., Computing and Informatics, vol. 30, 2011, pp. 881-900.*

Rakesh Kumar Mishra, "Automatic Moving Vehicles Information Extraction from Single Pass Woldview 2 Imagery," International Archives of the Photogrammetry, Remote Sensing and Spatial Information Sciences, Sep. 1, 2012, www.int-arch-photogramm-remote-sens-spatial-inf-sci.net, pp. 1-6.

Georgios K. Ouzounis and Pierre Soille, "Attribute Constrained Connectivity and Alpha-Tree Representation," Global Security and Crisis Management Unit, Institute for the Protection and Security of the Citizen, Joint Research Centre, European Commission, University of Groningen, Groningen, Netherlands, Jan. 24, 2012.

D. Ehrlich, T. Kemper, X. Blaes, P. Soille, "Extracting building stock information from optical satellite imagery for mapping earthquake exposure and its vulnerability," Institute for the Protection and Security of the Citizen, Joint Research Centre, European Commission, Nov. 20, 2012.

Georgios K. Ouzounis and Pierre Soille,"The Alpha-Tree Algorithm, Theory, Algorithms, and Applications," JRC Technical Reports, Joint Research Centre, European Commission, Dec. 2012.

Martino Pesaresi et al., "A Global Human Settlement Layer from Optical HR/VHR RS data: concept and first results," IEEE Journal of Selected Topics in Applied Earth Observations and Remote Sensing, Aug. 15, 2013, vol. 6, No. 5.

Martino Pesaresi, Georgios K. Ouzounis, and Lionel Gueuguen, "A new compact representation of morphological profiles: report on first massive VHR image processing at the JRC," Algorithms and Technologies for Multispectral, Hyperspectral, and Ultraspectral Imagery XVIII, Proc. of SPIE vol. 8390 839025-5, Apr. 23, 2012.

Georgios K. Ouzounis, Martino Pesaresi, and Pierre Soille, "Differential Area Profiles: Decomposition Properties and Efficient Computation," IEEE Transactions on Pattern Analysis and Machine Intelligence, Dec. 20, 2011.

Martino Pesaresi et al., "A Global Human Settlement Layer from Optical High Resolution Imagery, Concept and First Results," Joint Research Centre, European Commission, Institute for the Protection and Security of the Citizen, Dec. 2012.

Lionel Gueguen et al., "Tree Based Representations for Fast Information Mining From VHR Images," IPSC—Global Security and Crisis Management Unit, Joint Research Centre, European Commission, Oct. 2012.

Lionel Gueguen et al., Hierarchical Data Representation Structures for Interactive Image Information Mining, International Journal of Image and Data Fusion, Sep. 2012, vol. 3, Issue 3.

* cited by examiner

MULTI-SPECTRAL IMAGE LABELING WITH RADIOMETRIC ATTRIBUTE VECTORS OF IMAGE SPACE REPRESENTATION COMPONENTS

BACKGROUND

The use of geospatial or overhead imagery has increased in recent years and represents a significant tool that may be utilized in a number of contexts. As such, high quality geospatial imagery has become increasingly valuable. For example, a variety of different entities (e.g., individuals, governments, corporations, or others) utilize geospatial imagery (e.g., satellite imagery) for a multitude of applications in a variety of contexts.

With increasingly capable satellites being commissioned and launched, very high resolution (VHR) remotely-sensed multispectral Earth imagery has become increasingly available and useable. For example, as the number of satellite image acquisition systems in operation grows, acquisition ability and flexibility improves. In an example, Digital-Globe, Inc. of Longmont, Colo. currently operates a number of satellites including, IKONOS, GeoEye-1, QuickBird, WorldView 1, WorldView 2, and WorldView 3. Accordingly, around the clock global coverage may be achieved through the satellite constellation currently in operation. For instance, the DigitalGlobe constellation of satellites can image the entire Earth's landmass every 75 days and may capture over six times the Earth's landmass every year with a capacity to collect at least 2.6 million square kilometers of imagery a day. With selective tasking, DigitalGlobe's satellite constellation may quickly and continually collect imagery from targeted locations to provide near real time feedback on global events or the like.

Furthermore, the resolution of image acquisition satellites also continues to increase. For instance, currently operated satellites may acquire images with a maximum spatial resolution of 50 cm (wherein each pixel in the images corresponds with the distance measure of the spatial resolution). Additionally, planned satellite launches may provide even greater resolution capabilities with spatial resolutions as high as about 30 cm or greater (i.e., less than 30 cm, such as 25 cm, 15 cm, or lower).

In this light, the amount and quality of VHR remotely-sensed multispectral Earth imagery continues to increase as does the amount and types of image data collected. Accordingly, the nature of the VHR remotely-sensed multispectral Earth imagery may facilitate uses beyond simply providing pixels as image data. For instance, higher level data processing may be applied to the images to, for example, identify objects, identify textures, or otherwise extract useful data from the raw image data. One such application has been in land use identification and land classification, where remotely-sensed images are analyzed to categorize pixels of an image into a category of land use or land class. As just one example, image pixels can be categorized or analyzed to identify and/or characterize areas of the urban settlement (e.g., the urban "build-up" or "built-up," such as three-dimensional man-made structures or the like).

As the amount of image data that is available grows and the nature of the image data acquired changes and is improved, advanced image data processing and image analytics are needed to keep pace with the advances in image acquisition technology to facilitate new techniques applied to acquired images to expand the number of applications for which such technology may be used.

SUMMARY

Broadly, disclosed herein are utilities (e.g., systems, processes, etc.) for automatically characterizing or categorizing portions of an input multispectral image based on a selected reference multispectral image. The input multispectral images to be characterized may be substantially raw images (e.g., as received at the image sensors of a satellite) or may be pre-processed in any appropriate manner (e.g., to appropriately account for atmospheric effects and/or the like). Sets (e.g., vectors) of radiometric descriptors of pixels of each component of a hierarchical representation of the input multispectral image can be collectively manipulated to obtain a set of radiometric descriptors for the component. Each component can be labeled as a (e.g., relatively) positive or negative instance of at least one reference multispectral image (e.g., mining materials, crops, etc.) through a comparison of the set of radiometric descriptors of the component and a set of radiometric descriptors for the reference multispectral image. Pixels may be labeled (e.g., via color, pattern, etc.) as positive or negative instances of the land use or type of the reference multispectral image in a resultant image based on components within which the pixels are found. Resultant images can be used in numerous contexts such as in analyzing mining materials, performing agricultural monitoring, identifying the presence of built-up, mapping constructed facilities, and the like.

In one arrangement, any appropriate fusion image or the like may be appropriately generated from the one or more input multispectral images to be used in the process of characterizing portions of the input multispectral image(s). For instance, a "similarity map" may be initially constructed from the input multispectral image by way of reducing a plurality of radiometric descriptors (e.g., intensity level values) at a plurality of spectral bands for each pixel of a plurality of pixels of the input multispectral image to a single radiometric descriptor for each pixel of the plurality of pixels of the input multispectral image. Each single radiometric descriptor thus encodes multispectral information for a respective pixel. The various single radiometric descriptors can be used as input for segmenting the image into a plurality of connected components of a hierarchical representation of the image (e.g., Max-Tree). Rather than generating multiple Max-Trees, for instance, from a plurality of respective grayscale values of the pixels (one Max-Tree per grayscale image), a single Max-Tree can now be constructed from multi-spectral information. As another example, a corresponding "dissimilarity map" may be constructed from the input multispectral image from which an Alpha-Tree may be generated.

In one aspect, a method for use in classifying areas of interest in overhead imagery includes organizing, using a processor, a plurality of pixels of at least one input multispectral image of a geographic area into a plurality of components of a hierarchical image representation structure; deriving, using the processor, at least one set of radiometric descriptors for each component of the plurality of components; obtaining at least one set of radiometric descriptors for a reference multispectral image; determining, using the processor, for each component of the hierarchical image representation structure, a similarity between the set of radiometric image descriptors for the component and the set of radiometric image descriptors of the reference multispectral image; and using the determined similarity metrics to determine a degree to which the pixels of each connected component identify the at least one land use or land type of the reference multispectral image.

In one arrangement, the deriving includes, for each pixel of the component, obtaining a set of radiometric descriptors for the pixel, wherein each set includes a plurality of entries, and using the sets of radiometric descriptors for the pixels of the component to derive the set of radiometric descriptors for the component. For instance, the set of radiometric descriptors for each pixel may be a vector of intensities of the pixel at each spectral band of a plurality of spectral bands of the input multispectral image or a vector of intensity gradients of the pixel over the plurality of spectral bands. More specifically, the sets of radiometric descriptors for the pixels of the component may be used to derive the set of radiometric descriptors for the component by way of obtaining means of each respective entry of the sets of radiometric descriptors of the pixels of the component to obtain radiometric descriptor mean values for corresponding respective entries of the set of radiometric descriptors for the component. For instance, the first entry in the vector for the component may be the mean of the first entries of the vectors for the pixels, the second entry in the vector for component may be the mean of the second entries of the vectors for the pixels, and so on.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrases "at least generally," "at least partially," "substantially" or the like in relation to a particular feature encompass the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

DETAILED DESCRIPTION

Figure 1:
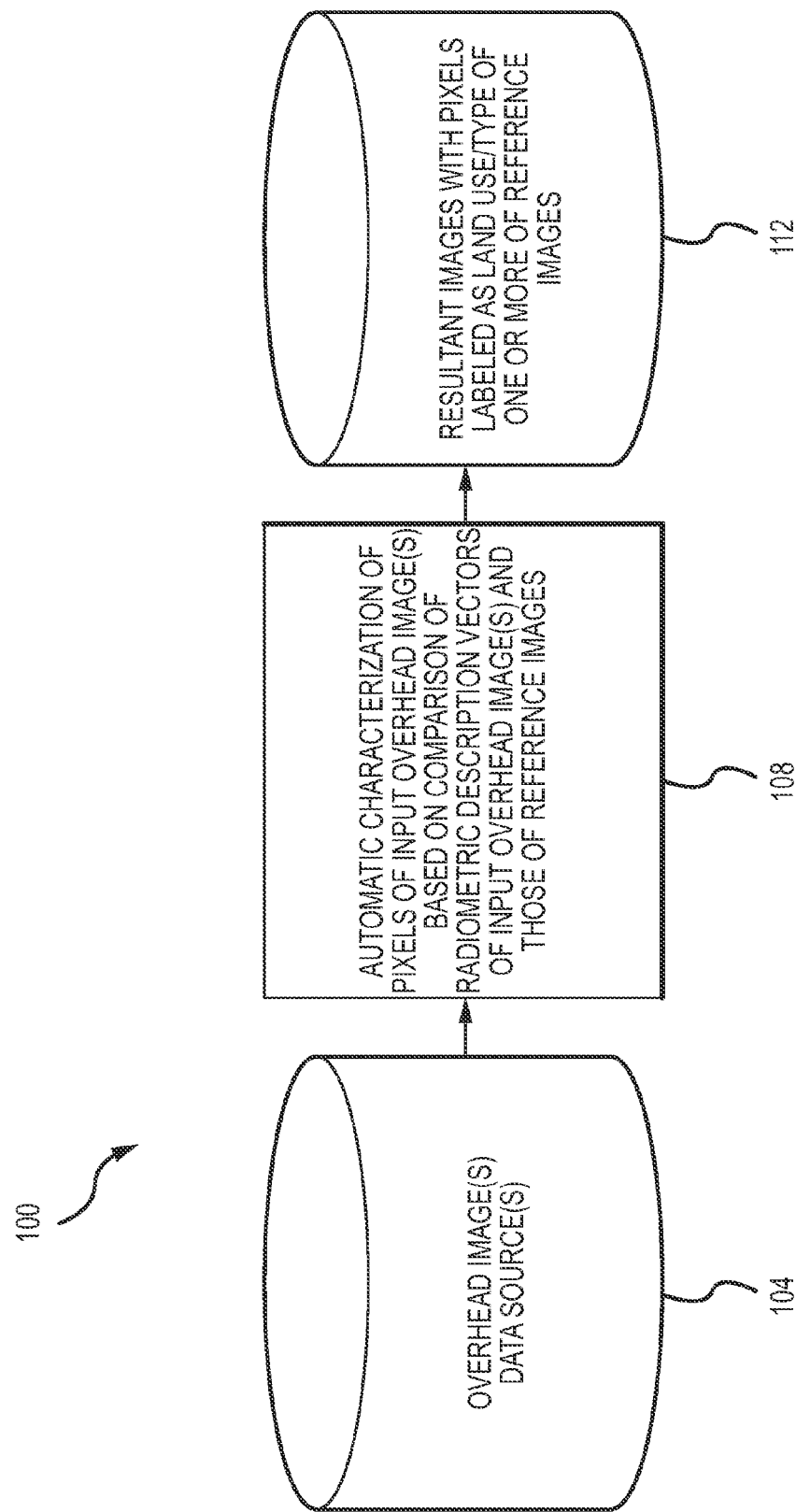
FIG. 1 is a simplified block diagram illustrating a process of detecting or characterizing pixels in multispectral overhead imagery of a geographic area.

At the outset, it is noted that, when referring to the earth herein, reference is made to any celestial body of which it may be desirable to acquire images or other remote sensing information. Furthermore, when referring to "overhead" imagery herein, such imagery may be obtained by any spacecraft, satellite, aircraft, and/or the like capable of acquiring images or other remote sensing information. Furthermore, the utilities described herein may also be applied to other imaging systems, including imaging systems located on the earth or in space that acquire images of other celestial bodies. It is also noted that the figures contained herein are not necessarily drawn to scale and that such figures have been provided for the purposes of discussion and illustration.

Generally, high resolution images of selected portions of a celestial body's surface have become a product desired and used by government agencies, corporations, and individuals. For instance, many consumer products in common use today include images of the Earth's surface, such as Google® Earth. Various types of remote sensing image collection platforms may be employed, including aircraft, earth-orbiting satellites, and the like. In the case of a consumer digital camera, as one non-limiting example, an image sensor is generally arranged in an area array (e.g., 3,000 rows of 3,000 pixels each, or 9,000,000 total pixels) which collects the image area in a single "snapshot." In the case of satellite-based imaging, as another non-limiting example, the "push-broom scanning" principle is sometimes employed whereby each image sensor includes a relatively small number of rows (e.g., a couple) of a great number of pixels (e.g., 50,000 or more) in each row. Each row of pixels may be scanned across the earth to build an image line by line, and the width of the image is the product of the number of pixels in the row times the pixel size or resolution (e.g., 50,000 pixels at 0.5 meter ground resolution produces an image that is 25,000 meters wide). The length of the image is controlled by the scan duration (i.e. number of lines), which is typically settable for each image collected. The resolution of overhead images varies depending on factors such as the particular instrumentation utilized, the altitude of the satellite's (or other aircraft's) orbit, and the like.

Image collection platforms (e.g., aircraft, earth-orbiting satellites, etc.) may collect or acquire various types of imagery in one or more manners. As one non-limiting example, image collection platforms may perform panchromatic collection of scenes of a celestial body which generally refers to the collection of image data across a single broad range of wavelengths (e.g., all visible light, from near infrared (NIR) to near ultraviolet (NUV), etc.). As another non-limiting example, image collection platforms may additionally or alternatively capture image data within the visible light band and include respective filters to separate the incoming light into red, green and blue portions. As a further non-limiting example, image collections platforms may additionally or alternatively perform multispectral collection of scenes of a celestial body which generally refers to the collection of image data at multiple specific spectral bands across the electromagnetic spectrum (e.g., within bands both inside and outside of the visible light range such as NIR, short wave infrared (SWIR), far infrared (FIR), etc.). For instance, a satellite may have one image sensor that is sensitive to electromagnetic radiation across only a first spectral band (e.g., the visible light band, such as a wavelength range of about 380-750 nm) in addition to one or more additional image sensors that are sensitive to electromagnetic radiation only across other spectral bands (e.g., NIR, 750-1400 nm; SWIR, 1400-3000 nm; etc.). Multispectral imaging may allow for the extraction of additional information from the radiance received at a satellite after being reflected from the Earth's surface (which may include atmospheric effects such as from aerosols, clouds, etc.).

Turning now to FIG. 1, a simplified block diagram of a system 100 is illustrated that may be used to automatically characterize portions of input multispectral images (e.g., <1-10 m spatial resolution satellite image data) based on an analysis of radiometric descriptors (e.g., intensity values) in the images. Initially, the system 100 obtains at least one input multispectral image of a geographic areas from any appropriate overhead image data sources 104 (e.g., SPOT 2 and 5, CBERS 2B, RapidEye 2 and 4, IKONOS® 2, QuickBird 2, WorldView-1, WorldView-2, WorldView-3, etc.) and performs the automated characterization 108 of portions (e.g., connected components, groups of pixels, etc.) of the input multispectral image based on a comparison of radiometric descriptor sets (e.g., vectors) of the portions and radiometric descriptor sets of one or more reference images corresponding to region types to be identified. The system 100 then generates resultant images 116 that depict or convey one or more detected or characterized region types in the input multispectral image such as water bodies, vegetation, metals, bare soil, etc.

Figure 2:
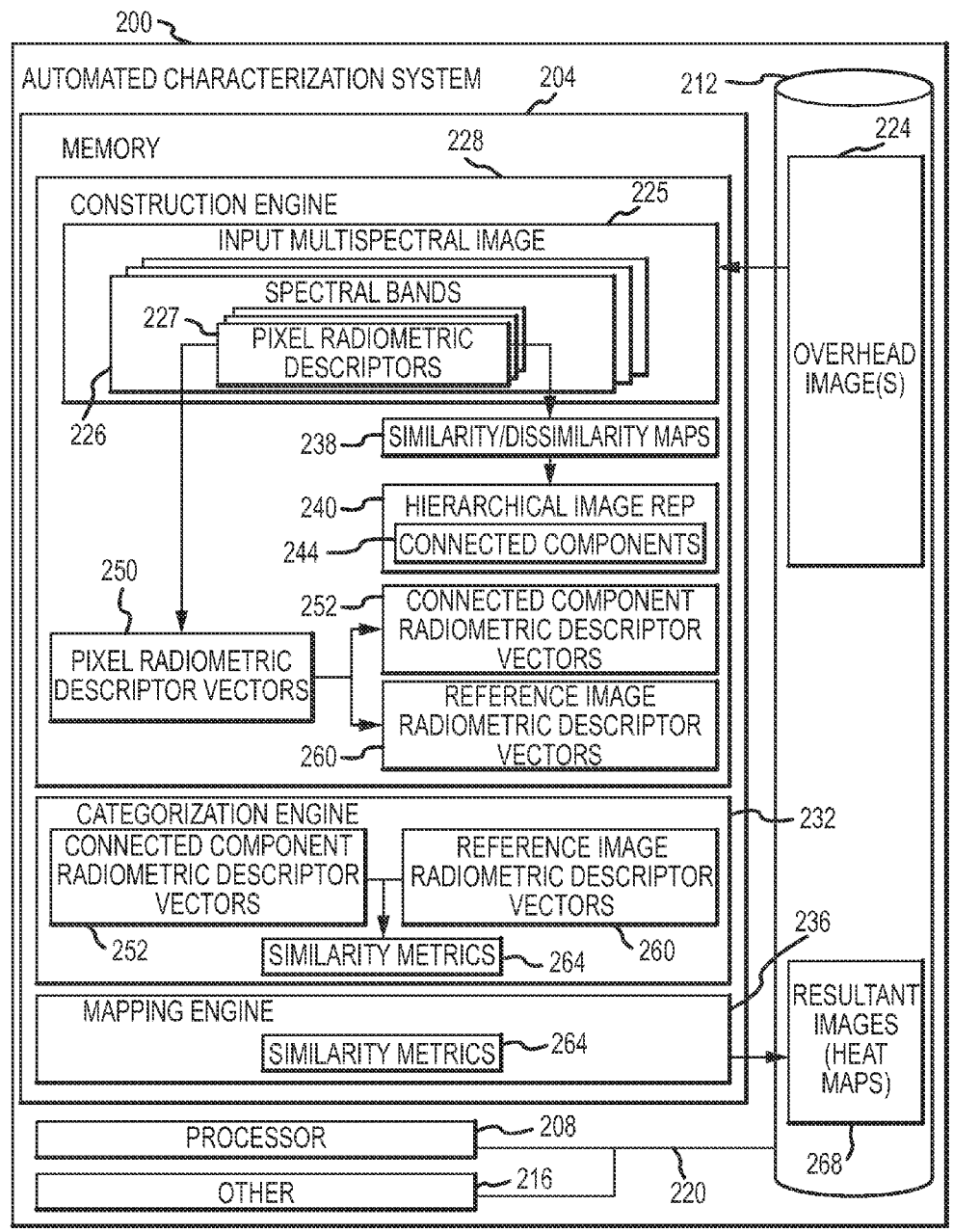
FIG. 2 is a more detailed block diagram of an automated system for characterizing pixels in multispectral overhead imagery of a geographic area.

FIG. 2 presents a more detailed block diagram of an automated system 200 that may be used to implement the automated characterization 108 of FIG. 1. Although depicted as a single device (e.g., server, workstation, laptop, desktop, mobile device, and/or other computing device), one or more functionalities, processes or modules of the system 200 may be allocated or divided among a plurality of machines, devices and/or processes which may or may not be embodied in a single housing. In one arrangement, functionalities of the system 200 may be embodied in any appropriate cloud or distributed computing environment.

Broadly, the system 200 may include memory 204 (e.g., one or more RAM or other volatile memory modules, etc.), a processing engine or unit 208 (e.g., one or more CPUs, processors, processor cores, or other similar pieces of hardware) for executing computer readable instructions from the memory 204, storage 212 (e.g., one or more magnetic disks or other non-volatile memory modules or non-transitory computer-readable mediums such as solid-state drives (SSDs)), and/or a number of other components 216 (e.g., input devices such as a keyboard and mouse, output devices such as a display and speakers, and the like), all of which may be appropriately interconnected by one or more buses 220. While not shown, the system 200 may include any appropriate number and arrangement of interfaces that facilitate interconnection between the one or more buses 220 and the various components of the system 200 as well as with other devices (e.g., network interfaces to allow for communication between the system 200 and other devices over one or more networks, such as LANs, WANs, the Internet, etc.).

The system 200 may appropriately retrieve one or more multispectral overhead images 224 of a geographic area (e.g., from one or more overhead image data sources 104 of FIG. 1) and store the same in any appropriate form in storage 212 (e.g., such as in one or more databases and manageable by any appropriate database management system (DBMS) to allow the definition, creation, querying, update, and administration of the databases). The processing engine 208 may execute a DBMS or the like to retrieve and load the one or more overhead images 224 into the memory 204 for manipulation by a number of engines or modules of the system 200 as will be discussed in more detail below.

As shown, the system 200 may include a construction engine 228 that is broadly configured to generate similarity maps from the radiometric descriptors of pixels at each of a plurality of spectral bands (e.g., three or more) of the input multispectral image, use the similarity map to generate hierarchical image representations, and generate sets (e.g., vectors) of radiometric descriptors for each connected component of the hierarchical image representation (e.g., where each entry in the vector represents a radiometric descriptor for the connected component at a respective one of the plurality of spectral bands). The system 200 may also include an analysis engine 232 that is broadly configured to analyze the sets of radiometric descriptors of the connected component in view of sets of radiometric descriptors of reference multispectral images to generate similarity metrics that are indicative of a degree to which the components identify one or more land uses or types (e.g., water bodies, agricultural, crops, etc.) of the reference multispectral images.

A mapping engine 236 may also be included to map categorized portions of the input multispectral image into a resultant image. For instance, the resultant image may be in the form of a heat map whereby color corresponds to land type and intensity level corresponds to confidence that the portion of the image actually corresponds to the particular land type. Each of the engines (and/or other engines, modules, logic, etc. disclosed and/or encompassed herein) may be in the form of one or more sets of computer-readable instructions for execution by the processing unit 208 and that may be manipulated by users in any appropriate manner to perform automated characterization of portions of an input multispectral image 225 for presentation on a display (not shown). In this regard, the combination of the processing unit 208, memory 204, and/or storage 212 (i.e., machine/hardware components) on the one hand and the various engines/modules disclosed herein in one embodiment create a new machine that becomes a special purpose computer once it is programmed to perform particular functions of the characterization utilities disclosed herein (e.g., pursuant to instructions from program software).

In one arrangement, any appropriate portal in communication with the various engines may run on the system 200 and be accessible by users (e.g., via any appropriate browser) to access the functionalities of the system 200. While the various engines have been depicted in FIG. 2 as being separate or distinct modules, it is to be understood that the functionalities or instructions of two or more of the engines may actually be integrated as part of the same computer-readable instruction set and that the engines have been depicted in the manner shown in FIG. 2 merely to highlight various functionalities of the system 200. Furthermore, while the engines have been illustrated as being resident within the (e.g., volatile) memory 204 (e.g., for execution by the processing engine 208), it is to be understood that the engines may be stored in (e.g., non-volatile) storage 212 (and/or other non-volatile storage in communication with the system 200) and loaded into the memory 204 as appropriate.

Figure 6:
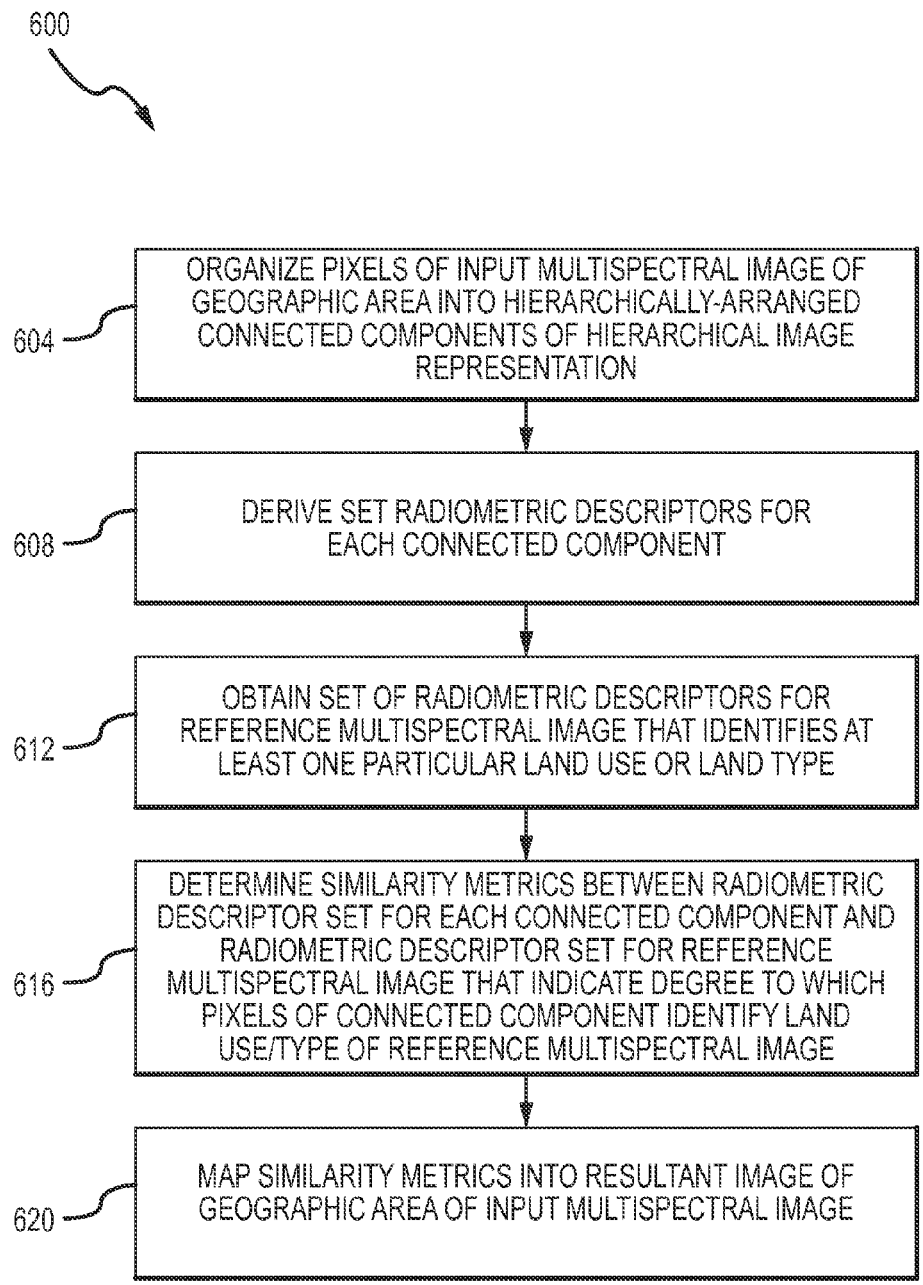
FIG. 6 is a flow diagram of a method for characterizing pixels in multispectral overhead imagery of a geographic area.

To facilitate the reader's understanding of the various engines and functionalities of the system 200, additional reference is now made to FIG. 6 which illustrates a method 600 for use in performing the automated characterization processes disclosed herein. While specific steps (and orders of steps) of the method 600 (as well as other methods disclosed herein) have been illustrated and will be discussed, other methods (including more, fewer or different steps than those illustrated) consistent with the teachings presented herein are also envisioned and encompassed within the present disclosure.

Figure 4:
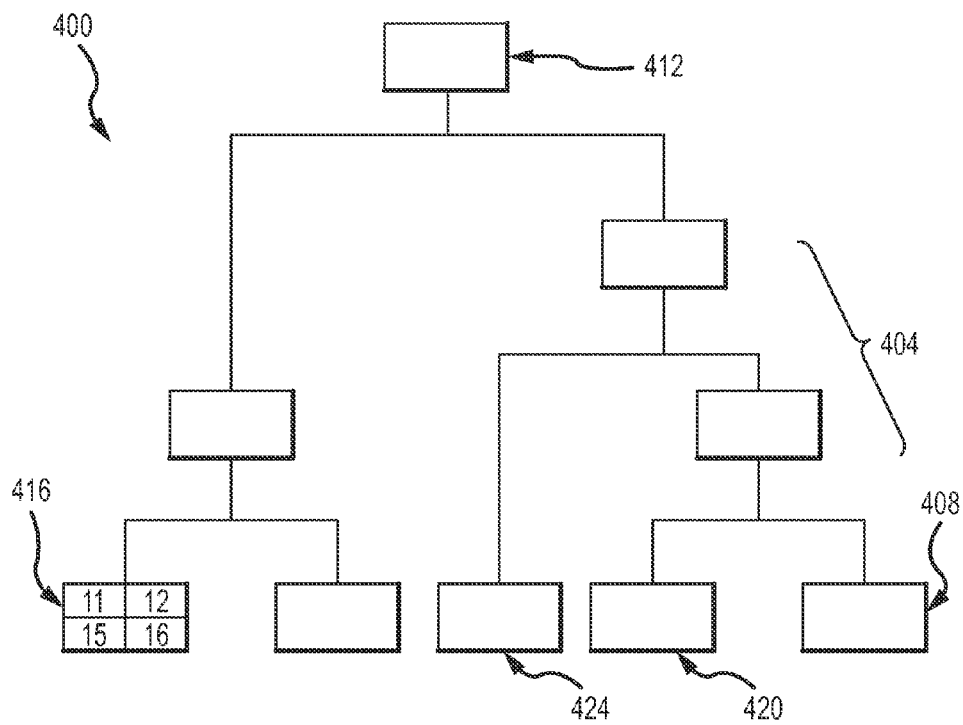
FIG. 4 illustrates a simplified hierarchical image representation of the input multispectral image of FIG. 3, where one of a plurality of connected components of the hierarchical image representation is shown to include four of the pixels of FIG. 3.

The method 600 may begin by organizing 604 the pixels of at least one input multispectral image (e.g., at least three frequency or spectral bands such as RGB bands, 8-bands, etc.) of a particular geographic area into a plurality of hierarchically connected components or nodes (e.g., groups of pixels that collectively define the input image(s) as whole) of a hierarchical image representation (e.g., hierarchical data structure, partition pyramid, etc.) that generally maps image partitions from fine to course. With reference to FIGS. 2 and 4, for instance, the construction engine 228 of the automated extraction system 200 may receive at least one input multispectral image 225 (including a plurality of spectral bands 226) of a particular geographic area and organize the pixels of the input multispectral image 225 into a plurality of connected components 244/404 (e.g., nodes) of a hierarchical image representation 240/400 (e.g., Max-Tree, Alpha Tree, etc.).

In the case of the hierarchical image representation 400 being in the form of an Alpha-Tree, for example, it may be a rooted, uni-directed tree or partition pyramid with its leaf components 408 corresponding to one or more pixels that are identical in relation intensity and/or the like and its root component 412 corresponding to the tip of the hierarchy (e.g., the single component whose extent defines the image definition domain), where pixels are grouped into connected components based on any appropriate definition or measure of dissimilarity between adjacent pixels of the input image (e.g., maximum pixel intensity, native reflectance, etc.). For instance, one manner of constructing an Alpha-Tree is disclosed in U.S. Pat. No. 8,682,079, entitled "Automatic Extraction of Built-Up Footprints from High Resolution Overhead Imagery through Manipulation of Alpha-Tree Data Structures," which is incorporated herein by reference in its entirety.

In the case of the hierarchical image representation 400 being in the form of a Max-Tree, for example, it may be a rooted, uni-directed tree with its leaf components 408 (e.g., leaf nodes) corresponding to regional maxima of any appropriate fusion image (e.g., the similarity map constructed from the input multispectral image) and its root component 412 (e.g., root node) corresponding to a single connected component defining the background of the input multispectral image. For instance, the input multispectral image may be thresholded at each of a number of intensity or grayscale levels to provide as many binary images as the number of grey levels, where each binary image may then be analyzed to derive its connected components 404. At least one morphological attribute filter (e.g., an edge preserving operator) may progressively accept (or reject) connected components 404 of the tree based on some attribute criterion. For instance, one manner of extracting built-up from high resolution overhead imagery is disclosed in U.S. patent application Ser. No. 13/955,268 and entitled "Automatic Generation of Built-up Layers from High Resolution Satellite Image Data," which is incorporated herein by reference in its entirety.

In one arrangement, the various spectral bands 226 of the input multispectral image 225 may be fused into a single band in any appropriate manner before the input multispectral image 225 is organized into the hierarchical image representation 240/400. Stated differently, the various radiometric descriptors 227 (e.g., intensity values) among the plurality of spectral bands 226 for each pixel may be fused into a single value for the pixel, where the single band includes the fused single values of the plurality of pixels of the input multispectral image 225. In one arrangement, and turning now to FIG. 7, a method 700 of generating a fusion image in the form of a similarity map from radiometric descriptors of pixels of an input multispectral image at each of a plurality of spectral band is illustrated, where the generated similarity map includes a plurality of single radiometric descriptors that each encodes multispectral radiometric descriptor information for a respective pixel of the image.

Figure 3:
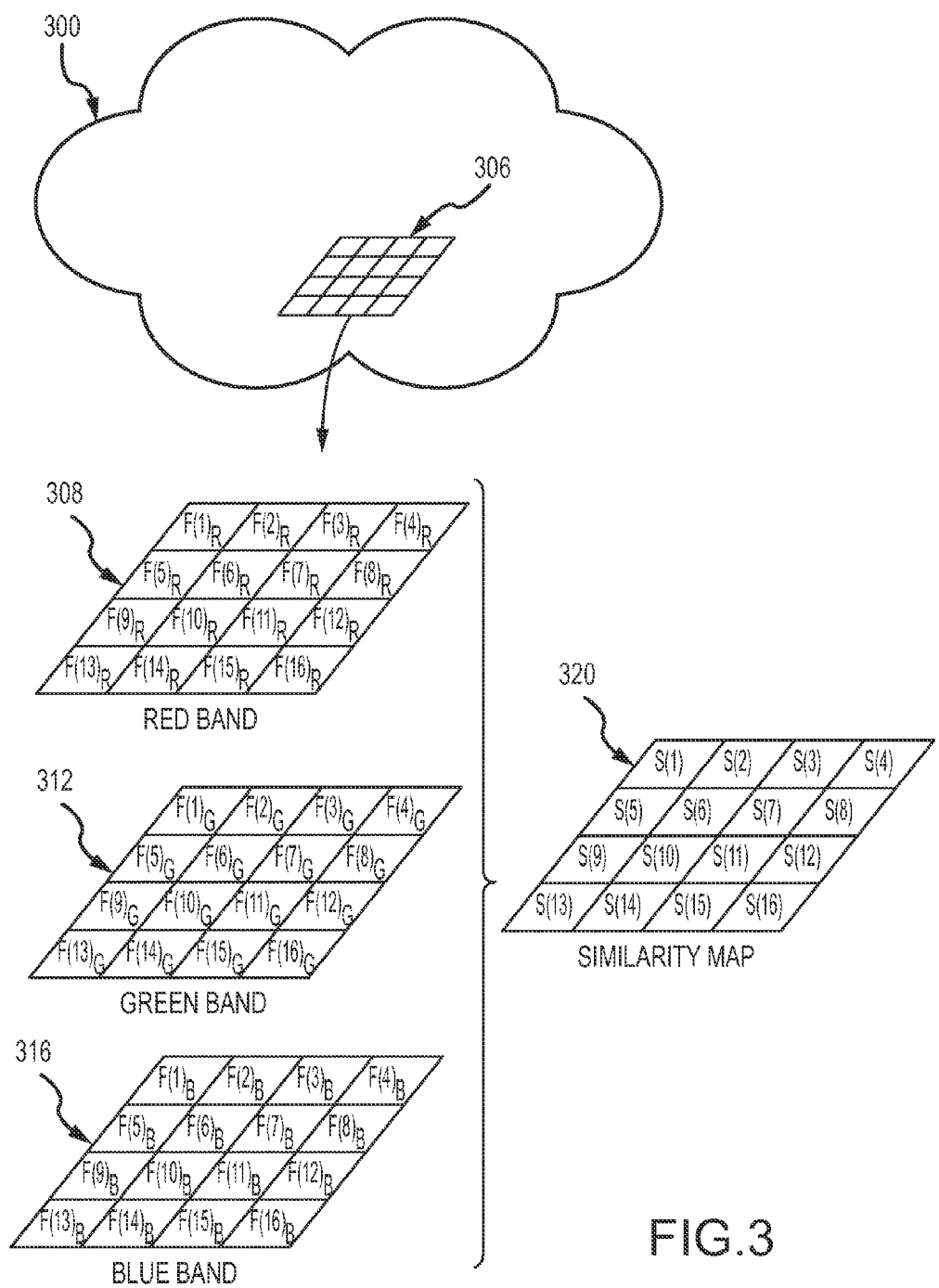
FIG. 3 is a schematic diagram illustrating the pixels of a portion of an input multispectral image of a geographic area at each of a plurality of spectral bands and a similarity map of the pixels that may be generated from radiometric descriptors of the pixels at each of the spectral bands.

Reference will also now be made to FIG. 3 which presents a schematic diagram of the pixels 306 of a portion of an input multispectral image 300 of a geographic area at each of a plurality of spectral bands 308, 312, 316 and a similarity map 320 of the pixels (e.g., similarity map 238 of FIG. 2) that may be generated from radiometric descriptors of the pixels at each of the spectral bands. Specifically, the numbers 1-16 in FIG. 3 represent pixel numbers (e.g., location IDs) of the pixels 306 in each of the spectral bands 308, 312, 316 (e.g., red, green, blue, and/or any other appropriate combination of bands) as well as in the similarity map 320. While generation of the similarity map 320 for pixels 1-16 of a portion of the input multispectral image 300 will be discussed, it is to be understood that in reality a similarity map 320 of all or substantially all of the pixels 306 of the entire input multispectral image 300 may be generated.

Figure 7:
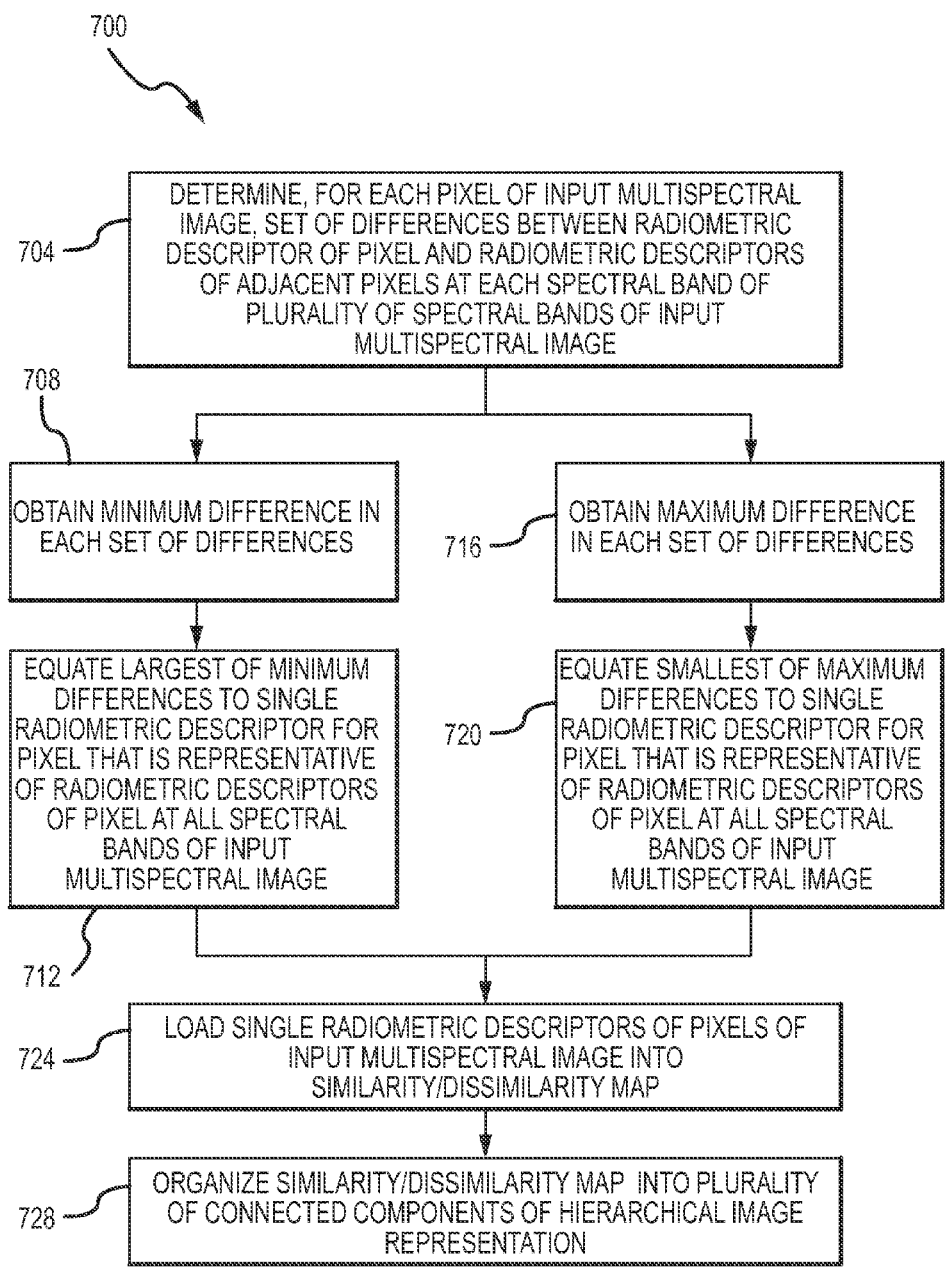
FIG. 7 is a flow diagram of a method of generating a similarity map from radiometric descriptors of pixels of an input multispectral image at each of the spectral bands.

At 704 of the method 700 of FIG. 7, a set (e.g., vector) of differences (absolute differences) for each pixel between a radiometric descriptor (e.g., pixel intensity) of the pixel and the radiometric descriptors (e.g., pixel intensities) of adjacent pixels (e.g., 4 neighbors, 8 neighbors, etc.) may be determined at each spectral band of the plurality of spectral bands of the input multispectral image. In the case of pixel "6" and its eight neighboring adjacent pixels in FIG. 3, for instance, the three sets of differences for the three spectral bands 308, 312, 316 may be respectively represented by:

$$\begin{bmatrix} |f(6)_R - f(1)_R| \\ |f(6)_R - f(2)_R| \\ |f(6)_R - f(3)_R| \\ |f(6)_R - f(5)_R| \\ |f(6)_R - f(7)_R| \\ |f(6)_R - f(9)_R| \\ |f(6)_R - f(10)_R| \\ |f(6)_R - f(11)_R| \end{bmatrix} \quad \begin{bmatrix} |f(6)_G - f(1)_G| \\ |f(6)_G - f(2)_G| \\ |f(6)_G - f(3)_G| \\ |f(6)_G - f(5)_G| \\ |f(6)_G - f(7)_G| \\ |f(6)_G - f(9)_G| \\ |f(6)_G - f(10)_G| \\ |f(6)_G - f(11)_G| \end{bmatrix} \quad \begin{bmatrix} |f(6)_B - f(1)_B| \\ |f(6)_B - f(2)_B| \\ |f(6)_B - f(3)_B| \\ |f(6)_B - f(5)_B| \\ |f(6)_B - f(7)_B| \\ |f(6)_B - f(9)_B| \\ |f(6)_B - f(10)_B| \\ |f(6)_B - f(11)_B| \end{bmatrix}$$

| Radiometric Descriptor Difference Set(*RDDS*) – Red Band | Radiometric Descriptor Difference Set(*RDDS*) – Green Band | Radiometric Descriptor Difference Set(*RDDS*) – Blue Band |
|---|---|---| where the numbers indicate pixel location or ID, and where "f( )_" indicates radiometric descriptor (e.g., intensity) of a particular pixel at a particular spectral band.

A similar process may be performed for each of the other pixels in the input multispectral image. In the case of pixel "11," for instance the differences between the intensity of pixel 11 (f(11)) and those of each of pixels 6, 7, 8, 10, 12, 14, 15 and 16 may be determined at each of the three spectral bands to obtain three corresponding RDDSs for pixel 11. In any case, the method 700 may, in one arrangement, include obtaining 708 a minimum one of the differences in each RDDS and then equating 712 the largest of the minimum differences to a single radiometric descriptor for the pixel that broadly represents the radiometric descriptors of the pixel at all of the spectral bands of the input multispectral image. Again in the case of pixel 6, the single radiometric descriptor of pixel 6 (s(6)) may be represented as:

$s(6)=\text{MAX}\{\text{MIN}\{RDDS\_RED_6\},$
$\quad \text{MIN}\{RDDS\_GREEN_6\},\text{MIN}\{RDDS\_BLUE_6\}\}$ A similar process may be performed for each of the other pixels 306 in the input multispectral image to obtain single radiometric descriptors for each of the other pixels 306 which may be loaded 724 into a similarity map 320 (e.g., similarity map 238), where the similarity map 320 may be organized 728 into a plurality of connected components of a hierarchical image representation (e.g., step 604 of FIG. 6). For instance, steps 708 and 712 of FIG. 7 may be performed for each pixel of the input multispectral image to obtain a similarity map 320 of single radiometric descriptors from which a hierarchical image representation in the form of a Max-Tree may be generated.

In another arrangement, the method 700 may include obtaining 716 a maximum one of the differences in each RDDS and then equating 720 the smallest of the maximum differences to a single radiometric descriptor for the pixel that broadly represents the radiometric descriptors of the pixel at all of the spectral bands of the input multispectral image. Again in the case of pixel 6, the single radiometric descriptor of pixel 6 (s(6)) may be represented as:

$s(6)=\text{MIN}\{\text{MAX}\{RDDS\_RED_6\},$
$\quad \text{MAX}\{RDDS\_GREEN_6\},$
$\quad \text{MAX}\{RDDS\_BLUE_6\}\}$ A similar process may be performed for each of the other pixels 306 in the input multispectral image to obtain single radiometric descriptors for each of the other pixels 306 which may be loaded 724 into a dissimilarity map (e.g., dissimilarity map 238, similar to similarity map 320, but instead with dissimilarity values for the pixels such as D(1), D(2), etc.), where the dissimilarity map may be organized 728 into a plurality of connected components of a hierarchical image representation (e.g., step 604 of FIG. 6). For instance, steps 716 and 720 of FIG. 7 may be performed for each pixel of the input multispectral image to obtain a dissimilarity map of single radiometric descriptors from which a hierarchical image representation in the form of an Alpha Tree may be generated.

Returning to FIG. 6, and after the pixels of the input multispectral image have been organized (e.g., based on their single radiometric descriptors of the similarity map 320 according to the method 700 of FIG. 7) into connected components of a hierarchical image representation (e.g., connected components 404 of hierarchical image representation 400 of FIG. 4), the method 600 may include deriving 608 (e.g., with construction engine 228) a set (e.g., vector) of radiometric descriptors for each connected component 404 (e.g., connected component radiometric descriptor vectors 252 of FIG. 2). Stated differently, the method 600 may include deriving 608 a radiometric descriptor for each spectral band for each connected component, where the radiometric descriptor of each spectral band collectively represents the radiometric descriptors of all pixels of the connected component at the respective spectral band.

To derive a set of radiometric descriptors for a connected component 404, respective sets or vectors 250 of radiometric descriptors or attributes for each of the pixels of the connected component 404 may first be derived or otherwise obtained. In one arrangement, each set of radiometric descriptors for each pixel of the connected component 404 may be a vector of the pixel's intensities over the plurality of spectral bands 226 of the input multispectral image 225. For instance, component 416 in FIG. 4 includes pixels 11, 12, 15 and 16 from input multispectral image 300 of FIG. 3. In this regard, the four vectors of pixel intensities over the three spectral bands 308, 312, 316 may be expressed as follows:

$$\begin{bmatrix} f(11)_R \\ f(11)_G \\ f(11)_B \end{bmatrix} \begin{bmatrix} f(12)_R \\ f(12)_G \\ f(12)_B \end{bmatrix} \begin{bmatrix} f(15)_R \\ f(15)_G \\ f(15)_B \end{bmatrix} \begin{bmatrix} f(16)_R \\ f(16)_G \\ f(16)_B \end{bmatrix}$$

In another arrangement, each set of radiometric descriptors for each pixel of the connected component 404 may be a vector of the pixel's intensity gradients over the plurality of spectral bands, wherein each intensity gradient is the difference between the pixel's intensity at one spectral band and the pixel's intensity at an adjacent spectral band. Again in relation to component 416 of FIG. 4, the four vectors of pixel intensity gradients over the three spectral bands 308, 312, 316 may be expressed as follows:

$$\begin{bmatrix} f(11)_R - f(11)_G \\ f(11)_G - f(11)_B \end{bmatrix}$$

$$\begin{bmatrix} f(12)_R - f(12)_G \\ f(12)_G - f(12)_B \end{bmatrix}$$

$$\begin{bmatrix} f(15)_R - f(15)_G \\ f(15)_G - f(15)_B \end{bmatrix}$$

$$\begin{bmatrix} f(16)_R - f(16)_G \\ f(16)_G - f(16)_B \end{bmatrix}$$

In a further arrangement, each set of radiometric descriptors for each pixel of the connected component 404 may be a vector of "critical" or "characteristic" parameters for the pixel including a maximum gradient of the pixel (e.g., the response R), the gradient ID (the ID of the entry in the vector corresponding to the maximum gradient, or the scale S), and the value of the largest intensity among the two intensities in the maximum gradient (e.g., the level L). In the case of pixel "11" of component 416, and assuming the intensity gradient of the first entry was larger than the intensity gradient of the second entry and that $f(11)_G$ is larger than $f(11)_R$, such a vector may be expressed as follows:

$$\begin{bmatrix} f(11)_R - f(11)_G \\ 0 \\ f(11)_G \end{bmatrix}$$

where the ID of the first entry is 0, the ID of the second entry is 1, and so on. A similar process may be performed to obtain sets of radiometric descriptors for pixels 12, 15 and 16 of component 416.

Once respective vectors 250 of radiometric descriptors or attributes for each of the pixels of the connected component 416 have been derived or otherwise obtained, such sets of radiometric descriptors or attributes for the pixels may be used to generate a single set of radiometric descriptors for the component 416. Broadly, any appropriate method that produces an average value for an entry of the component vector from all respective vector entries from the pixels making up the component may be used. In one arrangement, each entry in a vector 252 of radiometric descriptors for component 416 may be a mean value (e.g., average) of the corresponding entries in the vectors of radiometric descriptors of the pixels making up the component. For instance, the first entry in the vector 252 for component 416 may be the mean of the first entries of the vectors 250 for the pixels, the second entry in the vector 252 for component 416 may be the mean of the second entries of the vectors 250 for the pixels, and so on. In the case of the vectors of pixel intensities of the pixels 11, 12, 15 and 16 over the spectral bands 308, 312, 316, for instance, such a vector for component 404 may be expressed as:

$$\begin{bmatrix} \text{MEAN}\{f(11)_R, f(12)_R, f(15)_R, f(16)_R\} \\ \text{MEAN}\{f(11)_G, f(12)_G, f(15)_G, f(16)_G\} \\ \text{MEAN}\{f(11)_B, f(12)_B, f(15)_B, f(16)_B\} \end{bmatrix}$$

Additional metrics may be used to evaluate the variability of the averaging function. In one arrangement, the value might be refined by revisiting each pixel making up the respective component if the average value for any entry of the component vector shows high variability (e.g., where the contribution of a particular pixel's vector entry may be ignored in the event the entry has a value above a certain threshold on the variability metric). One manner in which the variabilities of the various entries may be assessed is by obtaining the standard deviation of the corresponding entries in the vectors of radiometric descriptors of the pixels making up the component. Again in the case of the vectors of pixel intensities of the pixels 11, 12, 15 and 16 over the spectral bands 308, 312, 316, a vector of standard deviations for component 404 may be expressed as:

$$\begin{bmatrix} \text{STD\_DEV}\{f(11)_R, f(12)_R, f(15)_R, f(16)_R\} \\ \text{STD\_DEV}\{f(11)_G, f(12)_G, f(15)_G, f(16)_G\} \\ \text{STD\_DEV}\{f(11)_B, f(12)_B, f(15)_B, f(16)_B\} \end{bmatrix}$$

For instance, the entry of a particular pixel may be removed or ignored if the entry is more than a particular number of standard deviations above the average. Upon revisiting all pixels making up the component and refining the selection of contributors, the average may then be recomputed. Additional examples of variability metric are the range between extreme values around the average, the principal components of the values making up the average, and/or the like.

Similar processes may be performed or executed to obtain respective sets (e.g., vectors) of radiometric descriptors for each of the other connected components 404 of the hierarchical image representation 400. In any case, the method 600 of FIG. 6 may also include ascertaining or otherwise obtaining 612 a set or vector 260 (see FIG. 2) of radiometric descriptors for a reference multispectral image (e.g., reference image "chip") that includes one or more attributes sought to be identified in one or more portions of the input multispectral image 225 (e.g., in one or more of the connected components 404 of the hierarchical image representation 400 of FIG. 4 of the input multispectral image 300 of FIG. 3). Various types of reference chips corresponding to various different types of land types, land uses, etc. (e.g., bare soil, parking lots, etc.) for identifying such land or land uses in the input multispectral image 225 are envisioned and encompassed herein. The reference multispectral image may be an image from the same platform or sensor and of the same number of spectral bands as the input multispectral image.

In one arrangement, the reference multispectral image may be a small and/or defined portion of a multispectral image with contents (e.g., pixels) coinciding explicitly to the radiometric pattern of interest (e.g., explicitly to forest, explicitly to pavement, etc.), such as a portion of the input multispectral image 225 (e.g., defined by rectangular coordinates or the like), a defined portion of another multispectral image that is non-overlapping with the input multispectral image, etc. For instance, a set of radiometric descriptors may be derived for each pixel of the defined portion (e.g., pixel radiometric descriptor vectors 250 of FIG. 2) and then the set of radiometric descriptors for the reference multispectral image may be derived from those of the pixels making up the defined portion. As discussed previously in relation to deriving the set of radiometric descriptors for each connected component of the hierarchical image representation using the sets of radiometric descriptors of the pixels making up the connected component, the set of radiometric descriptors of the reference multispectral image may be a vector including the same number and type of entries as that of a particular connected component 404 of the input multispectral image to be analyzed (various analyses discussed in more detail below).

In another arrangement, the set of radiometric descriptors of the reference multispectral image may be equated to the set of radiometric descriptors of at least one of the components of the hierarchical image representation 400. As an overly simplistic example, and in the case where the reference multispectral image overlaps with the input multispectral image, assume connected component 420 includes pixels corresponding to the radiometric pattern of interest (i.e., corresponding to the land use/type/etc. sought to be identified in connected component 416 and the other connected components 404). In this regard, the reference multispectral image radiometric descriptor vector 260 (FIG. 2) may be equated to the connected component radiometric descriptor vector 252 of connected component 420 (e.g., determined in step 608 of FIG. 6). Of course, more complicated arrangements are also envisioned. For instance, assume connected components 420 and 424 collectively include pixels corresponding to the radiometric pattern of interest. In this regard, the connected component radiometric descriptor vectors 252 of connected components 420, 424 may be appropriately combined or fused into a single reference multispectral image radiometric descriptor vector 260 (e.g., via taking a mean or standard deviation of each of the first entries, each of the second entries, etc.).

In another arrangement, such as in the case where the reference multispectral image is non-overlapping with the 225 input multispectral image and thus where a hierarchical image representation 400 (e.g., and corresponding connected component radiometric descriptor vectors) may not have been constructed for the area encompassing the reference multispectral image, the pixels of the area may be organized 604 into another hierarchical image representation and then radiometric descriptor vectors or sets may be derived 608 for the connected components of the hierarchical image representation. The radiometric descriptor vector(s) of the connected components corresponding to the reference multispectral image may then be equated to or appropriately fused into a reference multispectral image radiometric descriptor vector 260 for the reference multispectral image.

With reference again to FIG. 6, the method 600 may include determining 616 (e.g., via the analysis engine 232 of FIG. 2) a similarity or proximity metric 264 (FIG. 2) between the radiometric descriptor set of each connected component 404 of the input multispectral image and the radiometric descriptor set of the reference multispectral image. The determined similarity metrics 264 may be stored in memory 228 and/or in storage 212 of the system 200 in any appropriate manner. Broadly, increasing similarity or proximity corresponds to an increasing likelihood that the pixels of the particular connected component 404 under consideration associate to or otherwise identify the same land use or type as that of the pixels of the reference multispectral image. Various manners of determining such similarity metrics 264 are envisioned and included in the present disclosure. For instance, assume that x represents the radiometric descriptor vector 252 for the connected component 404 to be analyzed (e.g., for connected component 416 of FIG. 5), y represents the radiometric descriptor vector 260 for the reference multispectral image, and n represents the total number of entries in each of the vectors. In one arrangement, the similarity metric may be the Euclidean distance (d) between the two vectors which may be expressed as:

$$d = \sqrt{\sum_{1}^{n}(x_i - y_i)^2}$$

In another arrangement, the similarity metric may be the Manhattan distance (d) between the two vectors which may be expressed as:

$$d = \Sigma_1^n |x_i - y_i|$$

In another arrangement, the similarity metric may be the Pearson correlation (d) between the two vectors which may be expressed as:

$$d = 1 - \frac{Z(x) \times Z(y)}{n}$$

where:

$$Z_i(x) = \frac{x_i - \bar{x}}{std(x)}$$

$\bar{x}$: mean std(x): standard deviation of x

In another arrangement, the similarity metric may be the Cosine similarity ($\cos(\theta)$) between the two vectors which may be expressed as:

$$\cos(\theta) = \frac{x \times y}{\|x\| \times \|y\|}$$

Figure 5:
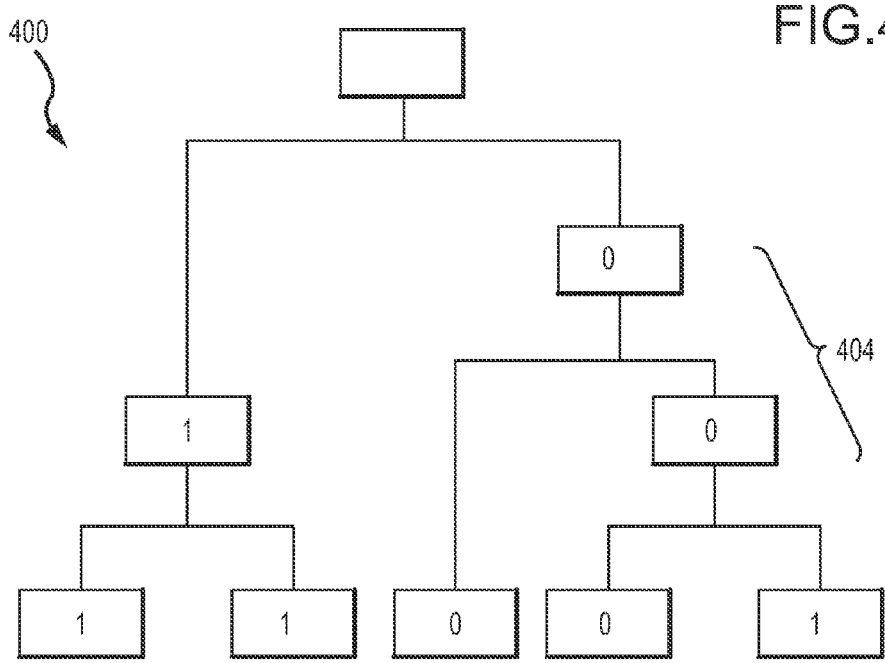
FIG. 5 illustrates the hierarchical image representation of FIG. 4, where the connected components include normalized scores as a result of performing a proximity analysis between radiometric descriptor sets of the connected components and a radiometric descriptor set of a reference multispectral image.

In one arrangement, the determining 616 may include assigning components 404 a first normalized similarity metric score (e.g., 1) when the determined similarity metric 264 is above or below a threshold metric indicating that pixels of the component 404 identify the at least one land use or land type of the reference multispectral image (e.g., are a positive instance of the land use/type of the reference multispectral image) or a second normalized similarity metric score (e.g., 0) when the determined similarity metric is the other of above or below the threshold metric indicating that pixels of the component 404 do not identify the at least one land use or land type of the reference multispectral image (e.g., are a negative instance of the land use/type of the reference multispectral image). As an example, FIG. 5 illustrates the hierarchical image representation 400 of FIG. 4, where the connected components 404 include normalized scores as a result of performing a proximity analysis between radiometric descriptor sets of the connected components 404 and a radiometric descriptor set of a reference multispectral image (e.g., reference image radiometric descriptor vector 260). In one arrangement, users may empirically (or otherwise) determine threshold metric levels above which indicate (e.g., with 80%, 90%, etc. certainty or the like) that the pixels of the particular connected component 404 identify the same land use or land type as the reference multispectral image. In any case, the use of "similarity metric" or variations thereof herein may connote both raw similarity metrics and normalized similarity metrics (e.g., normalized scores).

Returning to FIG. 6, the method 600 may then map 624 (e.g., via mapping engine 236 of FIG. 2) the determined similarity metrics into a resultant image 268 of the geographic area of the input multispectral image. Broadly, each pixel in the input multispectral image 225 may acquire the similarity metric(s) 264 of particular connected component(s) 244/404 within which the pixel is found or contained. For instance, a particular land use or land type of the reference multispectral image (e.g., built-up, vegetation, etc.) may be associated with a particular color while an increasing intensity of the color may convey an increasing degree to which a particular pixel identifies the particular land use or land type of the reference multispectral image (e.g., as part of a "heat map"). When the similarity metrics 264 of the components 244/404 are normalized to one of two scores (e.g., to positive or negative instances of the land use/type of the reference multispectral image), a first marking (e.g., color, pattern, etc.) may indicate a positive instance of the particular land use/type and a different second marking (e.g., color, pattern, etc.) or no marking may indicate a negative instance of the particular land use/type.

In the case of the hierarchical image representation 400 being in the form of a Max-Tree, each component 404 may include pixels that are different (e.g., unique) from those of every other component 404 in the representation 400. In the case of an Alpha-Tree, the pixels of each leaf component 408 may be different from those of every other leaf component 408. In any case, the analysis engine 232 may recursively determine 616 the similarity metric (e.g., raw, normalized, etc.) for each component 404 of the hierarchical image representation 400 (e.g., starting with the leaf components 408 and moving towards the root component 412) and store the same while the mapping engine 236 may map the determined metrics into a resultant image 268.

In one arrangement, the input multispectral image 225 of the geographic area may be partitioned or segmented into a series of partitions, where each partition includes a plurality of adjacent pixels of the input multispectral image 225. That is, rather step 604 of FIG. 6 including organizing the pixels of the input multispectral image into a plurality of components of a hierarchical image representation, step 604 may include pre-organizing the input multispectral image 225 into a partition of the image space, such as by mapping a grid of cells (e.g., squares, rectangles, etc.) over the image space of the geographic area. In this regard, step 608 of FIG. 6 may include deriving a set of radiometric descriptors for each partition/cell of the grid such as by deriving respective sets/vectors of radiometric descriptors for each of the pixels of the partition/cell and using the vectors of radiometric descriptors for the various pixels to derive the set of radiometric descriptors for the partition/cell (e.g., as discussed previously in relation to deriving the sets of radiometric descriptors for the components of the hierarchical image representations).

As also discussed previously, a set of radiometric descriptors for a reference multispectral image (chip) may be acquired or obtained 612, similarity metrics between the sets of radiometric descriptors of each of the partitions and the set of radiometric descriptors of the reference multispectral image may be determined 616, and the similarity metrics may be mapped 620 into a resultant image of the geographic areas indicating pixels of the input multispectral image that have the same land use or land type as that of the reference multispectral image (and/or indicating a degree to which pixels associate or convey the same land use or land type as that of the reference multispectral image). The automated characterization system 200 of FIG. 2 would thus be largely similar to that as discussed previously. For instance, reference numeral 240 would be the above-discussed partition structure (rather than the previously-discussed hierarchical image representation) while the connected components 244 would be the partitions/cells of the partition structure rather than the nodes of the hierarchical image representation. Furthermore, the similarity/dissimilarity maps 238 need not be computed and/or otherwise used in the case of the partition structure.

In some arrangements, similarity metrics 264 for two or more reference multispectral images may be determined for each component or partition of an input multispectral image 225 and combined into a single resultant image 268 in any appropriate manner. As an example, a first pass through the components 244/404 of a hierarchical image representation 240/400 or image space partition of an input multispectral image 225 may be made with a set 260 of radiometric descriptors of a first reference multispectral image for identifying pixels of the input multispectral image 225 that have the same land use or land type as that of the first reference multispectral image (and/or a relative degree to which pixels associate or convey the same land use or land type as that of the first reference multispectral image).

Another pass through the components 244/404 of the hierarchical image representation 240/400 or image space partition of the input multispectral image 225 may also be made with a set 260 of radiometric descriptors of a second reference multispectral image (e.g., including a different land use/type than that of the first reference multispectral image) for identifying pixels of the input multispectral image 225 that have the same land use or land type as that of the second reference multispectral image (and/or a relative degree to which pixels associate or convey the same land use or land type as that of the second reference multispectral image). For instance, pixels identifying the land use/type of the first reference multispectral image may be marked with a first color and pixels identifying the land use/type of the first reference multispectral image may be marked with a second color different than the first color. In one arrangement, an intensity of the color of a pixel may convey a relative degree to which the pixel convey or associates with the land use/type of the corresponding multispectral reference image (e.g., where increasing intensity conveys higher degree of confidences that the pixel identifies the particular land use/type and vice versa).

The utilities and functionalities disclosed herein may be used to identify various types of land uses or land types in various contexts. For instance, assume the system 200 generates or otherwise acquires respective vectors 260 of radiometric descriptors for reference chips (reference multispectral images) identifying a respective plurality of types of mining materials (e.g., coal, metals, limestone, etc.). In this regard, a user may be able to select (e.g., on any appropriate user interface in communication with the system 200) one of the reference chips and the system may be configured to automatically generate a corresponding resultant image 268 (e.g., heat map) of a geographic area of an input multispectral image 225 indicating how similar various portions (e.g., pixels) of the input multispectral image 225 are to the selected reference chip. In one embodiment, a user may be able to select a particular portion of the input multispectral image 225 to serve as the reference chip (e.g., via clicking and dragging a cursor on a user interface to create a box about the particular portion), where the system may then automatically generate a vector 260 of radiometric descriptors for the selected areas to be used in the determination of similarity metrics 264 of the remainder of the input multispectral image 225.

In another arrangement, the system 200 may be used for agricultural monitoring. For instance, assume a government subsidizes some of the operations of a particular farm in exchange for the farmer growing a field (e.g., ½ mile×½ mile) of soy beans. As part of the agreement, the government may want actual confirmation or at least reassurance that the entirety of the particular field is growing soy beans as opposed to only a portion of the field. In this regard, the input multispectral image may correspond to the entirety of the field while the reference multispectral image (reference chip) may correspond to a small portion of the field known to only include soybeans. For instance, a user may appropriately select a portion of an input multispectral image 225 of the field to serve as the reference chip.

After generating the respective sets 252 of radiometric descriptors of the components (or sets of radiometric descriptors for image partitions) of the input multispectral image 225 and the set of radiometric descriptors 260 of the reference chip, similarity metrics 264 may be generated and a heat map 268 of the field displayed conveying a degree to which the field is growing soy beans. As another example, a user may selected a desired reference chip (e.g., soy beans, corn, wheat, etc.) receive a heat map of how different other crops in the vicinity are to the selected crop, how healthy and/or unhealthy are crops of the same type, how mixed with other vegetation is the selected crop type, and/or the like. As a further example, a user may appropriate select a reference chip corresponding to a desired type of building material and receive a heat map of portions of an input multispectral image similar to the selected reference chip as part of classification of buildings, detection of buildings and constructed facilities (e.g., parking lots, road networks, etc.), and/or the like.

It will be readily appreciated that many deviations and/or additions may be made from or to the specific embodiments disclosed in the specification without departing from the spirit and scope of the invention. In one arrangement, any of the resultant images or heat maps may incorporate any appropriate textural attributes of the pixels of the input multispectral image. For instance, one or more geometric descriptors (e.g., contour, smoothness, linearity, area, etc.) may be derived for each of the plurality of components or partitions in any appropriate manner, where the one or more geometric descriptors may be conveyed in the resultant image 268 or heat map in any appropriate manner.

Embodiments disclosed herein can be implemented as one or more computer program products, i.e., one or more modules of computer program instructions encoded on a computer-readable medium for execution by, or to control the operation of, data processing apparatus. For example, the logic or software of the construction engine 228, analysis engine 232 and mapping engine 236 responsible for the various functionalities disclosed herein may be provided in such computer-readable medium of the automated categorization system 200 and executed by the processor 208 as appropriate. The computer-readable medium can be a machine-readable storage device, a machine-readable storage substrate, a non-volatile memory device, a composition of matter affecting a machine-readable propagated signal, or a combination of one or more of them. In this regard, the system 200 may encompass one or more apparatuses, devices, and machines for processing data, including by way of example a programmable processor, a computer, or multiple processors or computers. In addition to hardware, the system 200 may include code that creates an execution environment for the computer program in question, e.g., code that constitutes processor firmware, a protocol stack, a database management system, an operating system, or a combination of one or more of them.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The above described embodiments including the preferred embodiment and the best mode of the invention known to the inventor at the time of filing are given by illustrative examples only.

What is claimed is:

1. A method for use in classifying areas of interest in overhead imagery, comprising:
   organizing, using a processor, a plurality of pixels of at least one input multispectral image of a geographic area into a plurality of components of a hierarchical image representation structure;
   deriving, using the processor, at least one set of radiometric descriptors for each component of the plurality of components;
   obtaining at least one set of radiometric descriptors for a reference multispectral image, wherein pixels of the reference multispectral image identify at least one land use or land type;
   determining, using the processor, for said each component of the hierarchical image representation structure, a similarity metric between the set of radiometric descriptors for said each component and the set of radiometric descriptors of the reference multispectral image, wherein the determined similarity metric for said each component indicates a degree to which the pixels of said each component identify the at least one land use or land type of the reference multispectral image.

2. The method of claim 1, further including:
obtaining a single radiometric descriptor for each pixel that is representative of a plurality of radiometric descriptors of the pixel at a respectively plurality of spectral bands of the input multispectral image, wherein the organizing utilizes the single radiometric descriptors of the plurality of pixels to generate the hierarchical image representation.

3. The method of claim 2, wherein the obtaining the single radiometric descriptor for each pixel includes:
determining a minimum difference between the radiometric descriptor of the pixel and the radiometric descriptors of adjacent pixels at each spectral band of the spectral bands, wherein the single radiometric descriptor is a largest difference of the minimum differences at each spectral band of the plurality of spectral bands.

4. The method of claim 2, wherein the obtaining the single radiometric descriptor for each pixel includes:
determining a maximum difference between the radiometric descriptor of the pixel and the radiometric descriptors of adjacent pixels at each spectral band of the spectral bands, wherein the single radiometric descriptor is a smallest difference of the maximum differences at each spectral band of the plurality of spectral bands.

5. The method of claim 2, wherein the deriving includes, for each pixel of said each component:
obtaining a set of radiometric descriptors for the pixel, wherein each set includes a plurality of entries; and
using the sets of radiometric descriptors for the pixels of said each component to derive the set of radiometric descriptors for said each component.

6. The method of claim 5, wherein the set of radiometric descriptors for each pixel is a vector of intensities of the pixel at each spectral band of a plurality of spectral bands of the input multispectral image.

7. The method of claim 5, wherein the set of radiometric descriptors for each pixel is a vector of intensity gradients of the pixel over the plurality of spectral bands, wherein each intensity gradient is the difference between the intensity of the pixel at one spectral band and the intensity of the pixel at an adjacent spectral band.

8. The method of claim 5, wherein the using includes:
obtaining means of each respective entry of the sets of radiometric descriptors of the pixels of said each component to obtain radiometric descriptor mean values for corresponding respective entries of the set of radiometric descriptors for said each component.

9. The method of claim 8, further including:
obtaining variability metrics of each respective entry of the sets of radiometric descriptors of the pixels of said each component to obtain radiometric descriptor variability metrics for the corresponding respective entries of the set of radiometric descriptors for said each component;
analyzing each entry of each set of radiometric descriptors of the pixels in view of the respective radiometric descriptor variability metric of the corresponding entry of the set of radiometric descriptors for said each component; and
making a decision as to whether or not to remove each entry of each set of radiometric descriptors of the pixels from the obtaining means step based on a result of the analyzing step.

10. The method of claim 9, wherein the analyzing and making steps respectively include:
determining whether or not each entry of each set of radiometric descriptors of the pixels is above a threshold value of the respective radiometric descriptor variability metric of the corresponding entry of the set of radiometric descriptors for said each component; and
removing an entry of a set of radiometric descriptors of the pixels when the entry is above the threshold value.

11. The method of claim 9, wherein the variability metrics including standard deviations, a range between extreme entries around the mean, or principal entries making up the mean.

12. The method of claim 1, wherein the obtaining at least one set of radiometric descriptors for the reference multispectral image includes: equating the set of radiometric descriptors of at least one of the components of the hierarchical image representation of the input multispectral image to the set of radiometric descriptors of the reference multispectral image.

13. The method of claim 1, wherein the obtaining at least one set of radiometric descriptors for the reference multispectral image includes:
obtaining a set of radiometric descriptors for each pixel of a defined portion of the reference multispectral image, wherein each set includes a plurality of entries; and
deriving the set of radiometric descriptors for the reference multispectral image using the sets of radiometric descriptors for the pixels of the defined portion.

14. The method of claim 13, wherein the reference multispectral image is a portion of the input multispectral image.

15. The method of claim 14, wherein the multispectral image is non-overlapping with the input multispectral image.

16. The method of claim 13, further including:
determining, for each pixel of the defined portion, whether its set of radiometric descriptors deviates from the set of radiometric descriptors of the reference multispectral image by more than a threshold; and
re-deriving the set of radiometric descriptors for the reference multispectral image free of any sets of radiometric descriptors of pixels determined to deviate from the derived set of radiometric descriptors of the reference multispectral image by more than a threshold.

17. The method of claim 1, wherein the determining the similarity metric includes:
ascertaining at least one of a Euclidean Distance, a Manhattan Distance, a Pearson Correlation, or a Cosine Similarity between the set of radiometric descriptors for said each component and the set of radiometric descriptors of the multispectral reference image, wherein the at least one of the Euclidean Distance, the Manhattan Distance, the Pearson Correlation, or the Cosine Similarity is the similarity metric.

18. The method of claim 1, further including:
mapping the similarity metrics into a resultant image of the geographic area.

19. The method of claim 18, wherein the mapping includes:
applying a marking to pixels in the input multispectral image that is indicative of the similarity metric of a component within which the pixel is found.

20. The method of claim 19, wherein the marking includes at least one of a color, pattern, or shade.

21. The method of claim 18, wherein the determining the similarity metric further includes:

assigning said each component of the hierarchical image representation structure a first normalized similarity metric score when the similarity metric is above a threshold similarity metric indicating that pixels of said each component identify the at least one land use or land type of the reference multispectral image; and assigning said each component of the hierarchical image representation structure a second normalized similarity metric score when the similarity metric is below a threshold similarity metric indicating that pixels of said each component do not identify the at least one land use or land type of the reference multispectral image.

22. The method of claim 1, wherein the reference multispectral image is a first reference multispectral image, wherein the pixels of the reference multispectral image identify at least one first land use or land type, wherein the similarity metrics are first similarity metrics, and wherein the method further includes:

obtaining at least one set of radiometric descriptors for a second reference multispectral image, wherein pixels of the reference multispectral image identify at least one second land use or land type, and wherein the first land use or land type is different than the second land use or land type;

determining, using the processor, for said each component of the hierarchical image representation structure, a second similarity metric between the set of radiometric descriptors for said each component and the set of radiometric descriptors of the second reference multispectral image, wherein the determined second similarity metric for said each component indicates indicate a degree to which the pixels of each component identify the at least one second land use or land type; and mapping the first and second similarity metrics into a resultant image of the geographic area.

23. The method of claim 22, wherein the mapping includes:

applying a first marking to at least some of the pixels in the input multispectral image that is indicative of the first similarity metric of a component within which the pixel is found; and applying a second marking to at least some of the pixels in the input multispectral image that is indicative of the second similarity metric of a component within which the pixel is found, wherein the first and second markings are different.

24. The method of claim 23, wherein the first and second markings include first and second different colors, and wherein a relative intensity of each of the first and second markings indicates a degree to which a respective pixels indicates the first or second land use or land type.

* * * * *

UNITED STATES PATENT AND TRADEMARK OFFICE
CERTIFICATE OF CORRECTION

PATENT NO. : 9,619,711 B2
APPLICATION NO. : 14/499440
DATED : April 11, 2017
INVENTOR(S) : Ouzounis Page 1 of 1

It is certified that error appears in the above-identified patent and that said Letters Patent is hereby corrected as shown below:

In the Claims

Column 22, Line 5, delete "indicate"

Signed and Sealed this
Sixth Day of June, 2017

Michelle K. Lee
*Director of the United States Patent and Trademark Office*